(12) United States Patent
Saito

(10) Patent No.: US 9,182,841 B2
(45) Date of Patent: Nov. 10, 2015

(54) INPUT APPARATUS

(75) Inventor: Hitoshi Saito, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 96 days.

(21) Appl. No.: 13/595,164

(22) Filed: Aug. 27, 2012

(65) Prior Publication Data

US 2013/0057470 A1 Mar. 7, 2013

(30) Foreign Application Priority Data

Sep. 2, 2011 (JP) ................................. 2011-191459

(51) Int. Cl.
*G06F 3/033* (2013.01)
*G06F 3/039* (2013.01)
*G06F 3/0354* (2013.01)

(52) U.S. Cl.
CPC ............ *G06F 3/039* (2013.01); *G06F 3/03547* (2013.01)

(58) Field of Classification Search
None
See application file for complete search history.

(56) References Cited

U.S. PATENT DOCUMENTS

| 6,462,732 | B2 * | 10/2002 | Mehr ............................ 345/169 |
| 8,125,448 | B2 * | 2/2012 | Ranta et al. ................... 345/158 |
| 8,599,138 | B2 * | 12/2013 | Takahashi et al. ............. 345/168 |
| 2002/0163495 | A1 * | 11/2002 | Doynov ........................ 345/156 |
| 2003/0083596 | A1 * | 5/2003 | Kramer et al. ................ 600/595 |
| 2005/0088412 | A1 * | 4/2005 | Walton et al. ................. 345/163 |

FOREIGN PATENT DOCUMENTS

| JP | A-2003-337654 | 11/2003 |
| JP | 2007-504559 A | 3/2007 |
| JP | 2009-217302 A | 9/2009 |
| WO | 02/054215 A1 | 7/2002 |
| WO | 2005/027356 A2 | 3/2005 |

* cited by examiner

*Primary Examiner* — Kathy Wang-Hurst
*Assistant Examiner* — Douglas Wilson
(74) *Attorney, Agent, or Firm* — Oliff PLC

(57) ABSTRACT

An input apparatus includes a pointing device which has a main unit and an operation unit, and a fixing unit which fixes the pointing device to a hand. The pointing device is attached to the hand via the fixing unit when the input apparatus is used. The fixing unit fixes the main unit to the thumb side or the back side of the hand when the input apparatus is attached to the hand.

20 Claims, 4 Drawing Sheets

INPUT APPARATUS

BACKGROUND

1. Technical Field

The present invention relates to an input apparatus.

2. Related Art

An input apparatus known in the art includes a pointing device which has a main unit and an operation unit, and a fixing unit which fixes the pointing device to a hand of an operator, as an input apparatus operated with the pointing device attached to the hand of the operator via the fixing unit. When this input apparatus is attached to the hand, the main unit is fixed to the palm side of the hand (for example, see JP-A-2003-337654).

According to this type of input apparatus known in the art, the pointing device is fixed to the hand when the input apparatus is used. Thus, the input apparatus requires no space where the apparatus is to be placed, and can be used in any places without limitation to the installation position.

The "pointing device" in this context refers to a device used to operate an information device such as a personal computer, chiefly meaning a device used to shift a pointer (operation point). The "operation unit" in this context refers to a unit of the pointing device to be practically operated by the operator (such as an optical sensor, a trackball, a joystick, and a track pad). The "main unit" in this context refers to a unit of the pointing device which contains a transmission device for transmitting signals from the operation unit to the information device, a battery as a power source, and others.

However, this type of input apparatus known in the art is difficult to be operated by the hand of the operator who is holding an article or a tool by the same hand.

SUMMARY

An advantage of some aspects of the invention is to provide an input apparatus developed to solve the aforementioned problems, which apparatus can be operated by a hand of an operator who is holding an article or a tool by the same hand.

[1] An input apparatus according to an aspect of the invention includes: a pointing device which has a main unit and an operation unit; and a fixing unit which fixes the pointing device to a hand. The pointing device is attached to the hand via the fixing unit when the input apparatus is used. The fixing unit fixes the main unit to the thumb side or the back side of the hand when the input apparatus is attached to the hand.

According to the input apparatus of this aspect of the invention, the fixing unit fixes the main unit to the thumb side or the back side of the hand when the input apparatus is attached to the hand. In this case, the input apparatus does not occupy the palm side of the hand unlike a structure which fixes the main unit to the palm side of the hand. Thus, the input apparatus can be operated by the hand which is holding an article or a tool.

Moreover, according to the input apparatus of this aspect of the invention which does not occupy the palm side of the hand as noted above, another input device (such as a keyboard and other character input devices) can be operated by the hand even while the input apparatus is being attached to the hand.

Furthermore, according to the input apparatus of this aspect of the invention, the pointing device is fixed to the hand when the input apparatus is used. In this case, the input apparatus requires no space where the apparatus is to be placed, and can be used in any places without limitation to the installation position, similarly to the input apparatus in the related art.

[2] In the input apparatus according to the above aspect of the invention, it is preferable that the fixing unit fixes the operation unit to the thumb side of the hand.

According to this configuration, the operation unit can be operated only by the use of the thumb of the hand.

[3] In the input apparatus according to the above aspect of the invention, it is preferable that the fixing unit has a first fixing member positioned on the back side of the hand when attached to the hand, a second fixing member positioned on the palm side of the hand when attached to the hand, and a carrying unit positioned on the thumb side of the hand when attached to the hand and carrying the operation unit.

According to this configuration, the pointing device can be fixed under the condition of the hand sandwiched between the first fixing member and the second fixing member when the input apparatus is attached to the hand. Thus, fixation of the pointing device can be stabilized.

Moreover, the movement direction of the thumb with respect to the back of the hand does not greatly change at the time of movement or grasp of the hand. Accordingly, this structure can maintain the maneuverability of the input apparatus felt by an operator of the input apparatus even at the time of movement or grasp of the hand.

[4] In the input apparatus according to the above aspect of the invention, it is preferable that the fixing unit has a shift mechanism capable of shifting the operating unit.

According to this configuration, the input apparatus can be used by various operators whose hands and fingers have different sizes and lengths.

[5] In the input apparatus according to the above aspect of the invention, it is preferable that the pointing device is a wireless-connection pointing device.

According to this configuration, the hand to which the input apparatus is attached can freely move regardless of the position of an information device. Thus, the input apparatus can be easily operated by the hand even when the hand is holding an article or a tool.

The "wireless-connection pointing device" in this context refers to a pointing device of a type which connects with an information device by using wireless connection system such as radio waves and infrared light (for example, wireless-connection system in conformity with Bluetooth (registered trademark of Bluetooth SIG) standards).

[6] In the input apparatus according to the above aspect of the invention, it is preferable that the input apparatus further includes an inclination detection unit.

According to this configuration, the information device can also be operated by inclination of the hand to which the input apparatus is attached. Thus, the input apparatus can perform the inputting function by plural methods.

[7] In the input apparatus according to the above aspect of the invention, it is preferable that the input apparatus further includes a click button.

According to this configuration, a target indicated by a pointer can be selected by using the click button producing an effect similar to that of a mouse generally available (so-called "click" operation). Thus, the input apparatus can perform the inputting function by a still wider variety of methods.

The "click button" in this context refers to a button having a function similar to that of a click button (press button) of a mouse generally available.

[8] In the input apparatus according to the above aspect of the invention, it is preferable that the click button is disposed in the vicinity of the operation unit at a position shifted toward the root of the thumb of the hand from the operation unit when the input apparatus is attached to the hand.

This configuration facilitates the click input operation, and the operation of the operation unit with press of the click button (so-called "drag" operation).

BRIEF DESCRIPTION OF THE DRAWINGS

The invention will be described with reference to the accompanying drawings, wherein like numbers reference like elements.

DESCRIPTION OF EXEMPLARY EMBODIMENTS

An input apparatus according to exemplary embodiments of the invention is hereinafter described with reference to the drawings.

First Embodiment

Figure 1A:
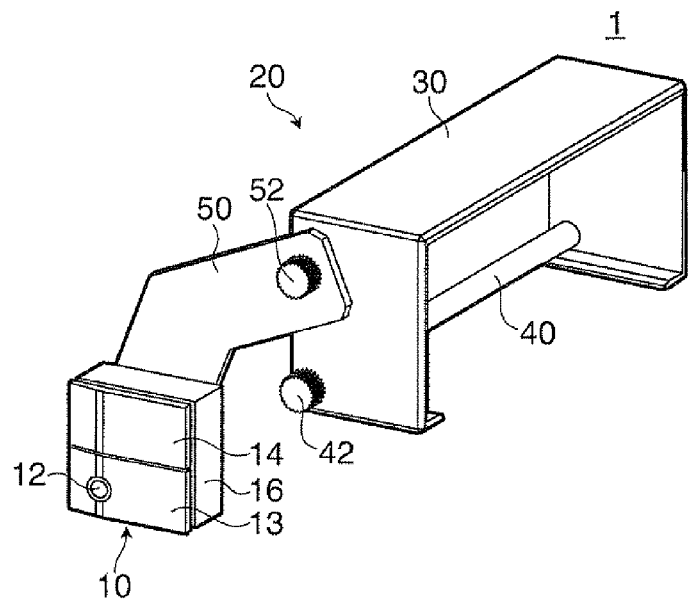
FIGS. 1A and 1B illustrate an input apparatus 1 according to a first embodiment.
Figure 1B:
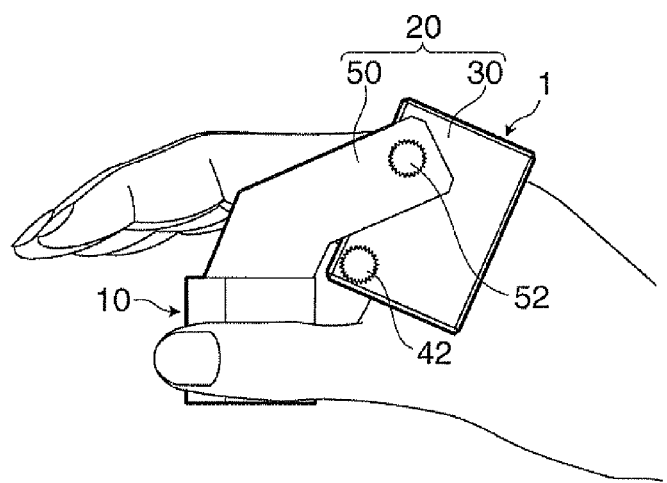

FIGS. 1A and 1B illustrate an input apparatus 1 according to a first embodiment. FIG. 1A is a perspective view of the input apparatus 1, while FIG. 1B is a side view of the input device 1 attached to a hand. FIG. 1B does not show a second fixing member 40 which is an invisible component as viewed in the figure.

As illustrated in FIGS. 1A and 1B, the input device 1 in the first embodiment includes a pointing device 10, and a fixing unit 20 for fixing the pointing device 10 to a hand of an operator. The input apparatus 1 is operated with the pointing device 10 attached to the hand via the fixing unit 20. FIGS. 1A and 1B and other figures show a condition of the input apparatus 1 attached to the right hand of the operator.

The input apparatus according to the embodiment of the invention may be an input apparatus attached to a left hand. The thumb of the left hand is positioned on the side opposite to the thumb of the right hand. Thus, the position of a carrying unit 50 (and the position of an operation unit 12) of the input apparatus for the left hand is located on the side opposite to the corresponding position of the input apparatus 1 shown in the figures.

The pointing device 10 includes the operation unit 12 operated by the thumb of the hand, click buttons 13 and 14, and a main unit 16. The pointing device 10 is constituted by a wireless-connection pointing device. The pointing device 10 may be a wire-connection pointing device (a type connected with an information device via a cord or a cable).

The operation unit 12 has an optical sensor which detects movement of the thumb in the vicinity of the sensor. The operation unit 12 may be constituted by a unit including a trackball, a joystick, or a track pad, for example, as well as the optical sensor.

The click buttons 13 and 14 are constituted by press buttons. As illustrated in FIG. 1A, the click button 13 is disposed at a position in the vicinity of the operation unit 12 and closer to the root of the thumb of the hand than the position of the operation unit 12 with respect to the root of the thumb when the input apparatus 1 is attached to the hand. For example, the click button 13 has a function similar to that of a left click button of a mouse generally available, while the click button 14 has a function similar to that of a right click button of a mouse generally available. The input apparatus is not required to have these click buttons. In the case of a structure which eliminates the click buttons, the operation unit may have an inputting function similar to that of the click buttons (for example, inputting function similar to that of the click buttons performed by tapping the operation unit using the thumb). The input apparatus may have three or more click buttons or other buttons. Furthermore, the input apparatus may have a button operated by a finger other than the thumb (for example, a press button disposed on the side surface of the main unit and operated by a forefinger).

The main unit 16 has an inclination detection unit, a transmission unit, and a battery, and houses these components within a case. According to the first embodiment, the operation unit 12 is attached to the main unit 16 with direct contact therebetween.

The inclination detection unit is a device containing a gravity sensor, a gyro sensor, or others, for example. The structure including the combination of the inclination detection unit and the click buttons in this embodiment allows operation of the information device in accordance with inclination of the input apparatus with press of the click buttons, providing a wide variety of the inputting methods such as drag and display screen shift.

As illustrated in FIG. 1B, the fixing unit 20 fixes the main unit 16 to the thumb side of the hand when the input apparatus 1 is attached to the hand. According to the first embodiment, the main unit 16 and the operation unit 12 are combined into one body. Thus, the fixing unit 20 also fixes the operation unit 12 to the thumb side of the hand under this condition.

As illustrated in FIG. 1A, the fixing unit 20 has a first fixing member 30 positioned on the back side of the hand when attached to the hand, the second fixing member 40 positioned on the palm side of the hand when attached to the hand, and the carrying unit 50 positioned near the thumb of the hand when attached to the hand and carrying at least the operation unit 12. Though not shown in the figures, the surfaces of the constituent elements of the fixing unit 20 are coated with rubber so as to improve fitness of these elements to the hand when attached to the hand in the input apparatus 1 according to the first embodiment. The surfaces of the constituent elements of the fixing unit 20 may be coated with other materials (such as various types of resin). The surfaces of the constituent elements of the fixing unit 20 are not required to be coated with rubber or other materials when the degree of fitness is sufficiently high.

According to the first embodiment, the first fixing member 30 functions as a base stand to which other elements of the fixing unit 20 (second fixing member 40 and carrying unit 50) are attached. The first fixing member 30 has a substantially U shape as viewed in the direction of insertion of the hand.

The second fixing member 40 has a bar shape. The second fixing member 40 is attached to the first fixing member 30 via a fixing screw 42. The operator of the input apparatus 1 can hold an article or a tool while wearing the input apparatus 1 on the hand since the second fixing member 40 disposed on the palm side of the hand does not carry the operation unit and the main unit thereon.

The first fixing member 30 and the second fixing member 40 are both made of metal (such as stainless steel). According to this structure, the pointing device 10 can be securely fixed even when the hand to which the input apparatus 1 is attached moves.

According to the first embodiment, the carrying unit 50 carries the entire body of the pointing device 10. The carrying unit 50 is attached to the first fixing member 30 via a fixing screw 52. The fixing screw 52 can be loosened for determining the position of the carrying unit 50, and tightened after determination of the position of the carrying unit 50 at the time of adjustment of the fixing position of the operation unit 12 relative to the position of the thumb of the hand. In other words, the fixing unit 20 has a shift mechanism capable of shifting the operation unit 12.

According to the input apparatus 1 in the first embodiment, the fixing unit 20 fixes the main unit 16 to the thumb side or the back side of the hand when the input apparatus 1 is attached to the hand. In this case, the input apparatus 1 does not occupy the palm side of the hand unlike an input apparatus having a fixing unit which fixes the main unit to the palm side of the hand. Thus, the operator can operate the input apparatus 1 while holding an article or a tool in the hand.

According to the first embodiment, the input apparatus 1 does not occupy the palm side of the hand when attached to the hand. Thus, the operator can use other input apparatus (such as a keyboard or other character input devices) while wearing the input apparatus 1 on the hand.

According to the input apparatus 1 in the first embodiment, the pointing device 10 is fixed to the hand. Therefore, the input apparatus 1 requires no space where the input apparatus 1 is to be placed, and can be used in any places without limitation to the installation position similarly to the input apparatus known in the art.

According to the input apparatus 1 in the first embodiment, the fixing unit 20 fixes the operation unit 12 to the thumb side of the hand. Accordingly, the operation unit 12 can be operated only by the use of the thumb of the hand.

According to the input apparatus 1 in the first embodiment, the fixing unit 20 has the first fixing member 30, the second fixing member 40, and the carrying unit 50. In this case, the pointing device 10 is fixed under the condition of the hand sandwiched between the first fixing member 30 and the second fixing member 40 when attached to the hand. Thus, fixation of the pointing device 10 can be stabilized.

According to the input apparatus 1 in the first embodiment, the maneuverability of the input apparatus 1 felt by the operator does not change even at the time of movement or grasp of the hand.

According to the input apparatus 1 in the first embodiment, the fixing unit 20 has the shift mechanism capable of shifting the operation unit 12. Thus, the input apparatus 1 can be used by various operators whose hands and fingers have different sizes and lengths.

According to the input apparatus 1 in the first embodiment, the pointing device 10 is constituted by the wireless-connection pointing device. In this case, the operator can freely move the hand to which the input apparatus 1 is attached regardless of the position of the information device. Accordingly, the operator can easily operate the input apparatus 1 while holding an article or a tool in the hand.

The input apparatus 1 according to the first embodiment has the inclination detection unit. In this case, the information device can be operated by inclination of the hand to which the input apparatus 1 is attached. Thus, the input apparatus 1 can perform the inputting function by plural methods.

According to the first embodiment, the input apparatus 1 has the click buttons 13 and 14. In this case, a target indicated by a pointer can be selected by using the click buttons 13 and 14 having the function similar to that of a mouse generally available (so-called "click" operation). Thus, the input apparatus 1 can perform the inputting function by a still wider variety of methods.

According to the input apparatus 1 in the first embodiment, the click button 13 is disposed at a position in the vicinity of the operation unit 12 and closer to the root of the thumb of the hand than the position of the operation unit 12 with respect to the root of the thumb when the input apparatus 1 is attached to the hand. This arrangement facilitates the click input operation, and the operation of the operation unit 12 with press of the click button 13 (so-called "drag" operation).

Second Embodiment

Figure 2A:
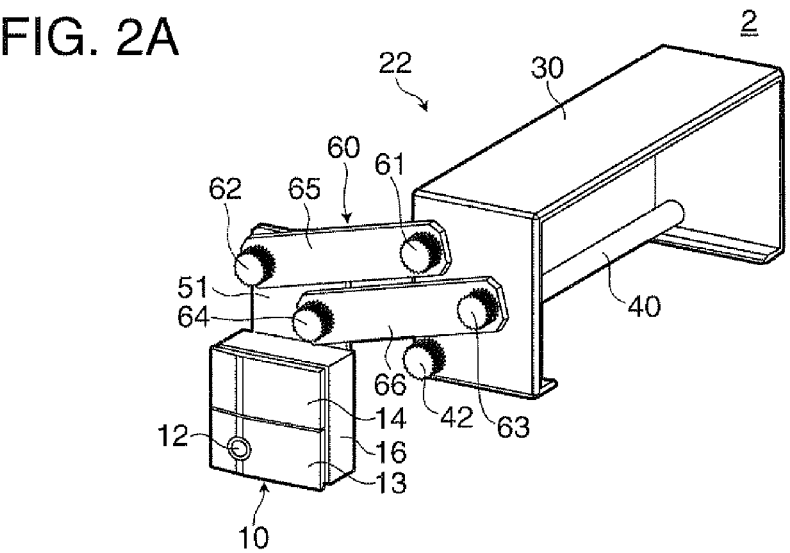
FIGS. 2A through 2C illustrate an input apparatus 2 according to a second embodiment.
Figure 2B:
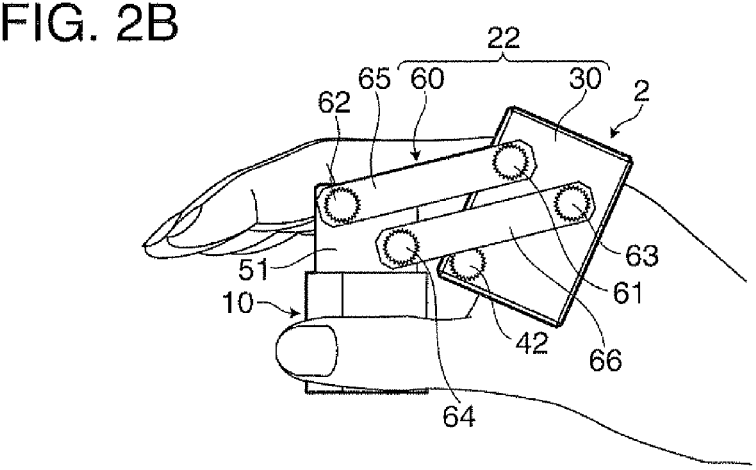
Figure 2C:
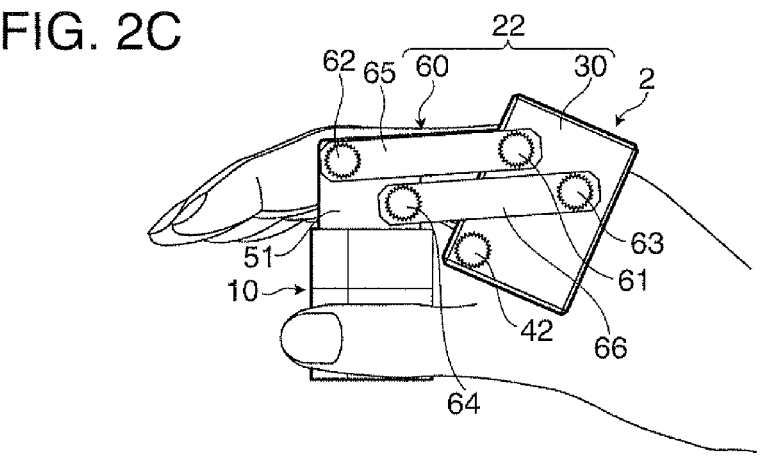

FIGS. 2A through 2C illustrate an input apparatus 2 according to a second embodiment. FIG. 2A is a perspective view of the input apparatus 2, FIG. 2B is a side view of the input apparatus 2 attached to a hand, and FIG. 2C is a side view illustrating a condition of a carrying unit 60 shifted from its position shown in FIG. 2B. FIG. 2B does not show the second fixing member 40 which is an invisible component in the figure.

The input apparatus 2 according to the second embodiment has a basic structure similar to that of the input apparatus 1 in the first embodiment. However, the input apparatus 2 is different from the input apparatus 1 in the first embodiment in that a link mechanism is provided on the input apparatus 2. More specifically, the input apparatus 2 according to the second embodiment has a link mechanism containing fixing screws 61, 62, 63, and 64, and link plates 65 and 66 as illustrated in FIGS. 2A through 2C. In other words, a fixing unit 22 has a shift mechanism capable of shifting the operation unit 12.

Each of the link plates 65 and 66 is constituted by a metal plate. The link mechanism can maintain the directional relationship between the back of the hand and the operation unit 12 at the time of shift of the operation unit 12 (see FIGS. 2B and 2C). Thus, the maneuverability of the pointer felt by the operator does not change even when the position of the operation unit 12 varies.

Accordingly, in the input apparatus 2 in the second embodiment, which is different from the input apparatus 1 in the first embodiment in that the link mechanism is provided, the fixing unit 22 fixes the main unit 16 to the thumb side or the back side of the hand when attached to the hand. In this case, the input apparatus 2 does not occupy the palm side of the hand similarly to the input apparatus 1 in the first embodiment, unlike the structure which fixes the main unit to the palm side of the hand. Thus, the operator can operate the input apparatus 2 while holding an article or a tool in the hand.

The input apparatus 2 according to the second embodiment has structures similar to the corresponding structures of the input apparatus 1 in the first embodiment except that the link mechanism is equipped. Accordingly, advantages similar to those of the input apparatus 1 in the first embodiment can be offered in the second embodiment.

Third Embodiment

Figure 3:
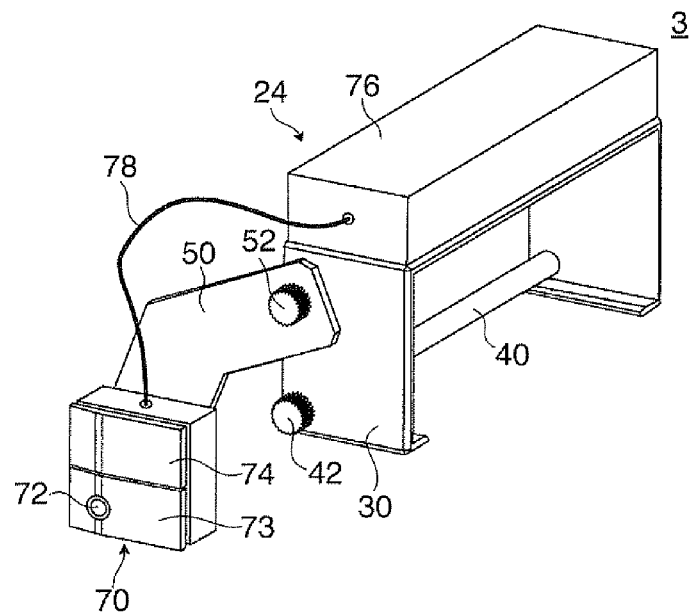
FIG. 3 is a perspective view of an input apparatus 3 according to a third embodiment.

FIG. 3 is a perspective view illustrating an input apparatus 3 according to a third embodiment.

The input apparatus 3 in the third embodiment has a basic structure similar to that of the input apparatus 1 in the first embodiment. However, the input apparatus 3 is different from the input apparatus 1 in the first embodiment in the structure of the pointing device. More specifically, a pointing device 70 of the input apparatus 3 in the third embodiment has an input unit 72, a click button 74, a main unit 76, and a connection cord 78 as illustrated in FIG. 3. A fixing unit 24 included in this structure fixes the main unit 76 to the back side of the hand when the input apparatus 3 is attached to the hand.

The input unit 72 and the click button 74 in this embodiment have structures similar to the corresponding structures of the input unit 12 and the click button 14 in the first embodiment, respectively, and the same explanation of these components is not repeated herein.

The main unit 76 has a function similar to that of the main unit 16 in the first embodiment. However, the main unit 76 is a component separated from the operation unit 72, and fixed to the back of the hand via the first fixing member 30. The operation unit 72, the click button 74, and the main unit 76 are connected with each other via the connection cord 78. The information detected by the operation unit 72 and the click button 74 is transmitted to the main unit 76 through the connection cord 78.

Accordingly, in the input apparatus 3 in the third embodiment, which is different from the input apparatus 1 in the first embodiment in the structure of the pointing device, the fixing unit 24 fixes the main unit 76 to the thumb side or the back side of the hand when the input apparatus 3 is attached to the hand. In this case, the input apparatus 3 does not occupy the palm side of the hand similarly to the input apparatus 1 in the first embodiment, unlike the structure which fixes the main unit to the palm side of the hand. Thus, the operator can operate the input apparatus 3 while holding an article or a tool in the hand.

The input apparatus 3 according to the third embodiment has structures similar to the corresponding structures of the input apparatus 1 in the first embodiment except for the structure of the pointing device. Accordingly, advantages similar to those of the input apparatus 1 in the first embodiment can be offered in the third embodiment.

Although various embodiments of the invention have been described in the foregoing detailed description, it will be understood that the invention is not limited to the embodiments disclosed, but is susceptible to numerous modifications and variations without departing from the spirit and scope of the invention. For example, the following changes may be made.

(1) The dimensions, numbers, materials, and shapes of the respective constituent elements shown as examples in the respective embodiments may be varied as long as the advantages of the invention can be offered.

(2) According to the respective embodiments, the first fixing member 30 and the second fixing member 40 are both made of metal. However, each of the first fixing member 30 and the second fixing member 40 may be constituted by a belt having flexibility. According to this structure, the shapes of the first fixing member and the second fixing member can fit the hand of the operator in a preferable condition, allowing operator fatigue to decrease. The flexible belt may be made of flexible materials such as various types of cloth and leather.

Figure 4:
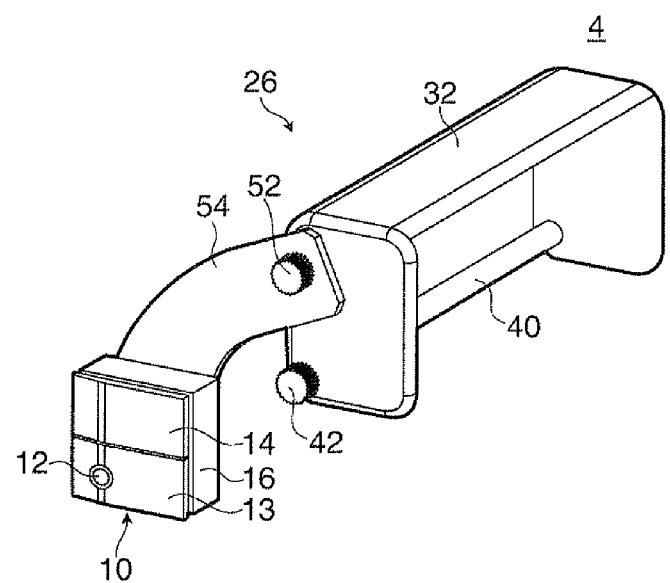
FIG. 4 is a perspective view of an input apparatus 4 according to a modified example 1.

(3) According to the respective embodiments, the fixing units having angular shapes are employed as illustrated in FIGS. 1A through 3. However, the configurations of the fixing units are not limited to these shapes. FIG. 4 is a perspective view of an input apparatus 4 according to a modified example 1. As illustrated in FIG. 4, a fixing unit 26 including rounded constituent elements (first fixing member 32 and carrying unit 54) may be used, for example. According to this structure, the feel of the material of the input apparatus 4 in contact with the hand improves.

Figure 5:
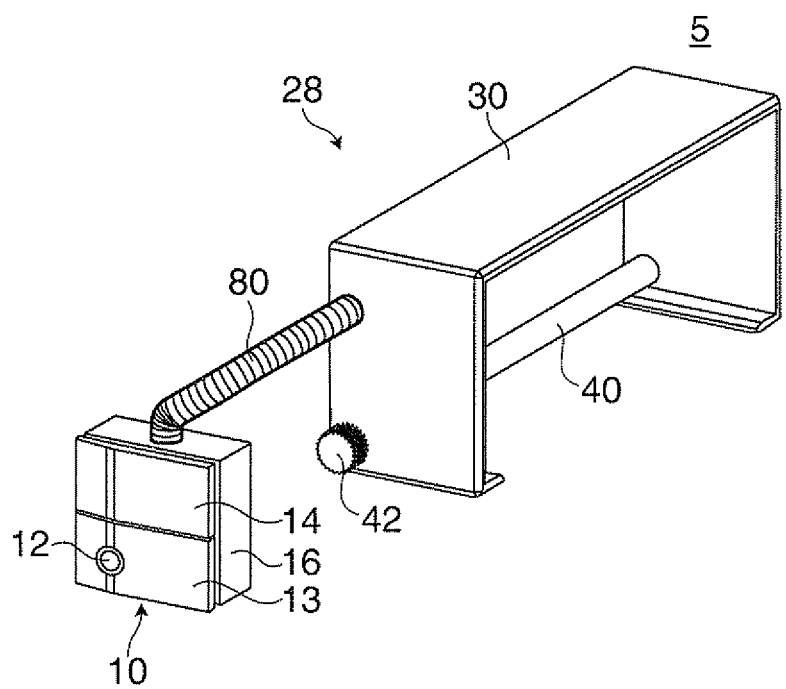
FIG. 5 is a perspective view of an input apparatus 5 according to a modified example 2.

(4) According to the respective embodiments, the operation units are movable by using the combination of the carrying unit constituted by a metal plate or the metal link plates, and the fixing screw(s) However, the invention is not limited to these examples. FIG. 5 is a perspective view of an input apparatus 5 according to a modified example 2. In FIG. 5, a component designated by reference number 80 corresponds to a flexible pipe. As illustrated in FIG. 5, the operation unit may be moved by using a component (flexible pipe in the modified example 2) other than the combination of the metal plates) and the fixing screw(s), for example.

The entire disclosure of Japanese Patent Application No. 2011-191459, filed Sep. 2, 2011 is expressly incorporated by reference herein.

What is claimed is:

1. An input apparatus comprising:
a pointing device which has a main unit and an operation unit;
a fixing unit which fixes the pointing device to a hand;
a click button disposed at a position shifted toward the root of the thumb of the hand from the operation unit when the input apparatus is attached to the hand, the click button having a larger surface area on a surface of the pointing device than a surface area of the operation unit; and
a shift mechanism disposed between the pointing device and the fixing unit, the shift mechanism being configured to rotate the pointing device only on a plane parallel to a surface of the pointing device on which the operation unit is located, wherein
the pointing device is attached to the hand via the fixing unit when the input apparatus is used, and the fixing unit fixes the main unit to the thumb side or the back side of the hand when the input apparatus is attached to the hand.

2. The input apparatus according to claim 1, wherein the fixing unit fixes the operation unit to the thumb side of the hand.

3. The input apparatus according to claim 2, wherein the fixing unit is so structured as not to occupy the palm side of the hand.

4. The input apparatus according to claim 2, wherein the structure of the fixing unit allows grasp of the hand for operation of another input device with the input apparatus attached to the hand.

5. The input apparatus according to claim 2, wherein the fixing unit has a U-shape as viewed in the direction of insertion of the hand into the fixing unit.

6. The input apparatus according to claim 2, wherein the input apparatus is so structured as to fit the back side of the hand even when the hand to which the input apparatus is attached moves.

7. The input apparatus according to claim 2, wherein the operation unit is disposed on the palm side of the hand of an operator near the thumb opposite to the little finger side such that the operation unit can be located at the position of the thumb.

8. The input apparatus according to claim 2, wherein the fixing unit has a first fixing member positioned on the back side of the hand when attached to the hand, a second fixing member positioned on the palm side of the hand when attached to the hand, and a carrying unit positioned on the thumb side of the hand when attached to the hand and carrying the operation unit.

9. The input apparatus according to claim 2, wherein the first fixing member carries the operation unit and the main unit.

10. The input apparatus according to claim 2, wherein the fixing unit is so constructed that a hand of an operator can be sandwiched between the first fixing member and the second fixing member.

11. The input apparatus according to claim 2, wherein the second fixing member has a bar shape which does not occupy the palm side of the hand of the operator.

12. The input apparatus according to claim 2, wherein the shift mechanism is configured to shift the operation unit.

13. The input apparatus according to claim 2, wherein the fixing unit has a link mechanism capable of shifting the operation unit.

14. The input apparatus according to claim 2, wherein the fixing unit has a mechanism capable of shifting the operation unit with flexibility.

15. The input apparatus according to claim 1, wherein the pointing device is a wireless-connection pointing device.

16. The input apparatus according to claim 1, further comprising an inclination detection unit.

17. The input apparatus according to claim 1, wherein the click button provides a click function.

18. The input apparatus according to claim 1, the input apparatus further comprising:
a rigid carrying unit which attaches the pointing device to the fixing unit, the carrying unit having a bent shape that bends in a curling direction of fingers of the hand when the input apparatus is attached to the hand.

19. The input apparatus according to claim 1, the input apparatus further comprising:
a carrying unit which attaches the pointing device to the fixing unit; and
a fixing screw which fixes the carrying unit to the fixing unit,
wherein the fixing screw fixes the pointing device in a fixed position relative to the fixing unit when the fixing screw is tightened.

20. The input apparatus according to claim 1, further comprising:
a carrying unit which attaches the pointing device to the fixing unit, wherein
the shift mechanism includes a fixing screw which fixes the carrying unit to the fixing unit, the shift mechanism being configured to adjust the fixing screw to move the pointing device between a plurality of fixed positions relative to the fixing unit,
a distance between the pointing device and the fixing unit remaining the same in each of the plurality of fixed positions as measured along a direction parallel to a rotational axis of the fixing screw.

* * * * *